(12) United States Patent
Raghuram et al.

(10) Patent No.: US 10,339,317 B2
(45) Date of Patent: Jul. 2, 2019

(54) COMPUTING DEVICES

(71) Applicant: Intel Corporation, Santa Clara, CA (US)

(72) Inventors: Yeluri Raghuram, Sunnyvale, CA (US); Susanne M. Balle, Hudson, NH (US); Nigel Thomas Cook, Boulder, CO (US); Kapil Sood, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 221 days.

(21) Appl. No.: 15/060,844

(22) Filed: Mar. 4, 2016

(65) Prior Publication Data

US 2017/0177873 A1 Jun. 22, 2017

Related U.S. Application Data

(60) Provisional application No. 62/269,666, filed on Dec. 18, 2015.

(51) Int. Cl.
| | |
|---|---|
| *H04L 9/08* | (2006.01) |
| *G06F 21/00* | (2013.01) |
| *G06F 21/53* | (2013.01) |
| *G06F 21/57* | (2013.01) |
| *G06F 21/71* | (2013.01) |

(52) U.S. Cl.
CPC ............ *G06F 21/575* (2013.01); *G06F 21/53* (2013.01); *G06F 21/71* (2013.01); *H04L 9/0822* (2013.01); *H04L 9/0894* (2013.01); *G06F 21/00* (2013.01)

(58) Field of Classification Search
CPC ........ G06F 21/575; G06F 21/53; G06F 21/71; G06F 21/00; H04L 9/0822

USPC .............................................................. 713/2
See application file for complete search history.

(56) References Cited

U.S. PATENT DOCUMENTS

| | | | | |
|---|---|---|---|---|
| 2006/0161750 A1* | 7/2006 | Perkins | ............... | G06F 21/6245 711/164 |
| 2007/0180515 A1* | 8/2007 | Danilak | ................... | G06F 21/79 726/16 |
| 2010/0111309 A1* | 5/2010 | Khatri | ................... | G06F 21/602 380/283 |
| 2010/0169640 A1* | 7/2010 | Smith | ................... | G06F 21/335 713/155 |
| 2011/0264925 A1 | 10/2011 | Russo et al. | | |

(Continued)

OTHER PUBLICATIONS

International Search Report and Written Opinion issued in PCT Application No. PCT/US2016/062139 dated Feb. 23, 2017; 13 pages.

(Continued)

*Primary Examiner* — Ji H Bae
(74) *Attorney, Agent, or Firm* — Patent Capital Group

(57) ABSTRACT

Disclosed herein are embodiments related to security in cloudlet environments. In some embodiments, for example, a computing device (e.g., a cloudlet) may include: a trusted execution environment; a Basic Input/Output System (BIOS) to request a Key Encryption Key (KEK) from the trusted execution environment; and a Self-Encrypting Storage (SES) associated with the KEK; wherein the trusted execution environment is to verify the BIOS and provide the KEK to the BIOS subsequent to verification of the BIOS, and the BIOS is to provide the KEK to the SES to unlock the SES for access by the trusted execution environment.

25 Claims, 9 Drawing Sheets

(56) References Cited

U.S. PATENT DOCUMENTS

| | | |
|---|---|---|
| 2012/0254602 A1 | 10/2012 | Bhansali et al. |
| 2013/0345530 A1 | 12/2013 | McRoberts et al. |
| 2014/0089650 A1* | 3/2014 | Polzin .................. G06F 12/14 713/2 |
| 2014/0089654 A1* | 3/2014 | Lerner ................ G06F 9/4416 713/2 |
| 2014/0089712 A1* | 3/2014 | Machnicki .............. G06F 1/26 713/324 |
| 2014/0230078 A1 | 8/2014 | Graham |
| 2015/0074425 A1* | 3/2015 | Griffes .................. G06F 21/79 713/193 |
| 2015/0149640 A1 | 5/2015 | Douglas et al. |
| 2017/0140151 A1* | 5/2017 | Nelson .................. G06F 1/26 |

OTHER PUBLICATIONS

"Network Functions Virtualisation (NFV); Architectural Framework," ETSI GS NFV 002, V1.2.1, Dec. 2014, 21 pages.

\* cited by examiner

COMPUTING DEVICES

CROSS-REFERENCE TO RELATED APPLICATION

This application claims priority to U.S. Provisional Patent Application No. 62/269,666, filed Dec. 18, 2015 and titled "SECURITY IN CLOUDLET ENVIRONMENTS." The priority application is incorporated by reference herein in its entirety.

BACKGROUND

Many computing applications are provided to end users via processing and storage resources centralized in room- or building-sized remote data centers. These data centers provide physical security for these resources, protecting them from physical tampering or theft.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
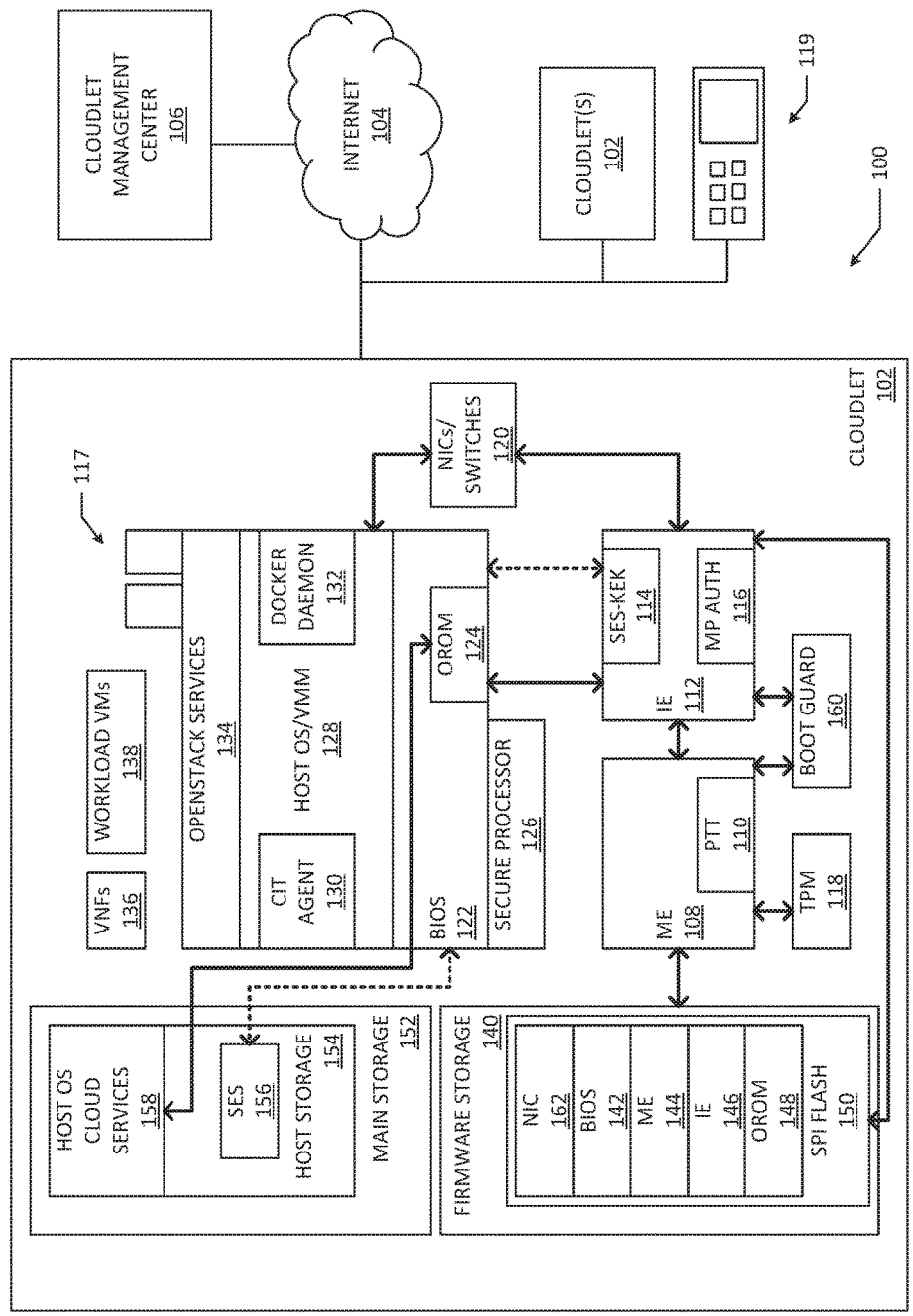
FIG. 1 is a block diagram of a networked computing system including one or more cloudlets, in accordance with various embodiments.

Conventional cloud computing systems typically locate storage and processing resources in centralized data centers, far from the user devices that direct these resources. The consequence of this arrangement is typically high latency and heavy traffic across the network. However, if these storage and processing resources are taken out of a centralized data center, and moved closer to the "edge" of the network (where the user devices are located), they are no longer under the physical protection and monitoring of the centralized data center, and the risk of physical compromise of these resources increases. In particular, these resources may be stolen and/or tampered with to cause them to behave in undesirable ways that are not readily detected. For example, a "remote" processing resource may download compromised cloud platform firmware, an operating system (OS), software virtual network function (VNF) updates, and/or patches from a remote site via the Internet, and this compromise may go undetected. In another example, a hacker may gain physical access to a competing resource and tamper with it so that it runs in a compromised state. Conventional computing systems are unable to trust that the software (e.g., firmware, OS, etc.) running on a remote computing resource has not been compromised.

Disclosed herein are methods and apparatus to provide tamper-resistant or tamper-proof security for cloudlets in environments where physical security cannot be assured. The cloudlets disclosed herein may provide a "cloud system in a box" that offers cloud computing system functionality without a hard requirement for connectivity back to a conventional cloud environment, and that meets the security requirements that service providers expect of their conventional data-center-based cloud resources. Various ones of the embodiments disclosed herein may relate to the creation of a hardware-enforced boot integrity scheme and chain of trust of the entire operating platform.

In some embodiments, the cloudlets disclosed herein may enable network function virtualization (NFV) and software defined networking (SDN) operators to extend their infrastructure of cloud services closer to their subscribers, achieving improvement in performance and latency without compromising security and reliability. Various ones of the embodiments disclosed herein may be particularly advantageous in mobile edge computing (MEC) (e.g., European Telecommunications Standards Institute (ETSI) MEC), fog computing, and cloud edge computing applications. For example, the cloudlets disclosed herein may support the secure implementation of Fifth Generation Mobile Network (5G) and MEC capabilities, and their associated usage scenarios.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The accompanying drawings are not necessarily drawn to scale.

FIG. 1 is a block diagram of a networked computing system 100 including one or more cloudlets 102, in accordance with various embodiments. As used herein, a "cloudlet" may refer to a computing resources (e.g., memory, processor, and networking devices) contained in a single housing (or small number of housings) to provide data storage, processing, and/or distribution functionality. A cloudlet may, in some embodiments, act as a small-scale data center. In some embodiments, as noted above, a cloudlet 102 may provide an essentially fully functional cloud system in a box, with no hard requirement for connectivity back to a full cloud environment. Various ones of the cloudlets 102 in the system 100 may be deployed in remote environments where physical security of the cloudlets 102 cannot be ensured (e.g., in a public park, on a street corner, in a shopping mall). The system 100 may include a single cloudlet 102, or multiple cloudlets 102 (e.g., tens or hundreds of cloudlets 102). An example embodiment of a cloudlet is discussed below with reference to FIG. 9.

Generally, a cloudlet 102 may run virtual functions, applications, workloads, and data storage and collection processes. In some embodiments, one or more of the cloudlets 102 may run one or more virtual network functions (VNFs) 136. For example, the VNFs 136 may include one or more VNFs provided by a Long Term Evolution (LTE) communications operator, such as virtual Evolved Packet Core (vEPC) or virtual Customer Premise Equipment (vCPE). In some embodiments, one or more of the cloudlets 102 may run one or more workload virtual machines (VMs) 138. As known in the art, each workload VM 138 may provide a separate instantiation of an operating system (OS) and applications running on top of the OS. The applications running in the workload VMs 138 may be any suitable application, such as video caching, transcoding, etc. The VNFs 136 and workload VMs 138 may utilize a set of OpenStack Services 134 running on a host OS/virtual machine manager (VMM) 128, and the host OS/VMM 128 may include a docker daemon 132 (e.g., for container management), as known in the art. One or more containers 117 may also run on the cloudlet 102, providing operating-system-level virtualization, as known in the art (e.g., for high performance computing applications). The security techniques disclosed herein may securely enable these capabilities of the cloudlet 102 (via, e.g., the use of keys and secrets) without the physical security of the centralized data center.

The cloudlet 102 may include multiple security components. For example, the cloudlet 102 may include a Manageability Engine (ME) 108. For example, the ME 108 may include a Converged Security and Manageability Engine (CSME). The ME 108 may be an independent trusted execution environment and may act as the root-of-trust for the manufacturer of the cloudlet 102 (e.g., to provide a secure environment for a manufacturer-controlled boot process). A trusted execution environment may provide one or more processors and memory devices that can execute code with a higher level of security than offered by the host OS/VMM 128, for example. In some embodiments, a trusted execution environment may be hardware- and/or software-isolated (e.g., by encryption) from the operation of the host OS/VMM 128, and thus may execute code in isolation from code executed as part of the host OS/VMM 128. In some embodiments, a trusted execution environment may be a secure area of the secure processor 126 in the cloudlet 102, and code executing in the trusted execution environment may be safe from tampering by code executing in the host OS/VMM 128.

In some embodiments, the ME 108 may be a secure service processor that runs a manufacturer-trusted and host-independent OS. The ME 108 may connect external management systems to the platform with various platform protocols and silicon capabilities, such as Intelligent Platform Management Interface (IPMI), Platform Environment Control Interface (PECI), and Host Embedded Controller Interface (HECI). In some embodiments, the ME 108 may connect with various hardware components via a secure fabric (e.g., Intel On-Chip System Fabric (IOSF)). The ME 108 may include a Platform Trust Technology (PTT) component 110 and may be in communication with a Trusted Platform Module (TPM) 118. As known in the art, a TPM 118 may include a chip (with a processing device) that can securely store data used to authenticate the platform of the cloudlet 102. As known in the art, the PTT 110 may provide credential storage and key management functionality, and may act as a firmware TPM (fTPM) that provides TPM functionality as an application on the ME 108.

The cloudlet 102 may include an Innovation Engine (IE) 112. The IE 112 may be in communication with the ME 108, and may be a separate independent trusted execution environment. In particular, the IE 112 may act as the root-of-trust for an operator (the platform owner) of the cloudlet 102 (e.g., a Telco Equipment Manufacturer (TEM)). The IE 112 may be provisioned per the operator's specific firmware. In some embodiments, the IE 112 may include a secure out-of-band (OOB) service processor that runs a host-independent OS trusted by the operator. The IE 112 may contain boot images and authentication credentials from the operator (stored, e.g., in fuses and a manifest), and may store operator authorization schemes for executing specific applications or applets within the IE 112. The IE 112 may connect external management systems to the platform with various platform protocols and silicon capabilities, such as IPMI, PECI, and HECI. In some embodiments, the IE 112 may connect with various hardware components via a secure fabric (e.g., IOSF). The IE 112 may provide an OOB manageability access point to the platform of the cloudlet 102, and may optionally include an fTPM. In some embodiments, the IE 112 may have a networking capability that the ME 108 may not have; for example, an Ethernet interface and related networking access. The IE 112 may also have access to dedicated platform accelerators, such as a Field Programmable Gate Array (FPGA).

The IE 112 may include a Multi-Party Authorization (MPA) component 116. In use, the IE 112 may itself be securely booted with signed images and signed configuration parameters, and, as noted above, may act as a hardware root of trust for the operator infrastructure (holding the security credentials for the OS and applications of the IE 112). The MPA component 116 may enable access control and explicit authorization for secure applications (e.g., NFV operator access, telemetry, monitoring, updates, etc.) to run within the IE 112. The IE 112 may also be responsible for verifying any UEFI/BIOS signatures that use the on-platform credentials (stored, e.g., in fuses). The IE 112 may store a Key-Encryption Key (KEK) for Self-Encrypting Storage (SES) 156; this KEK is denoted SES-KEK 114 in FIG. 1. The SES 156 is discussed in further detail below. The ME 108 and the IE 112 may include their own processors, cryptocores, Static Random-Access Memory (SRAM), etc.

The cloudlet 102 may include a Boot Guard component 160. The Boot Guard component 160 may provide hardware-based boot integrity protection to prevent unauthorized software and malware takeover of boot blocks of the cloudlet 102. In some embodiments, the Boot Guard component 160 may be included in an authenticated code module (ACM). The ACM is firmware that is configured to call the appropriate CPU instructions to perform the Boot Guard measurement and verification. The ACM code may be privileged code that is signed by the manufacturer or another trusted entity. In some embodiments, the ACM may be part of the secure processor 126, discussed below. The Boot Guard component 160 may provide a measured boot in which the initial boot block is measured into the TPM 118 or the PTT 110, or a verified boot in which the initial boot block is cryptographically verified using a boot policy key. The Boot Guard component 160 may be utilized by a central processing unit (CPU) of the cloudlet 102 to boot up and trigger signing and verification processes during boot. The ME 108 and the IE 112 may be verified by hardware before CPU boot begins.

The cloudlet 102 may include a secure processor 126. The secure processor 126 may be a security-enhanced general purpose processor. In some embodiments, the secure processor 126 may include a Software Guard Extensions (SGX) component (not shown) to provide the secure processor 126 with a set of instructions that can be used by applications to set aside private regions of code and data in "secure enclaves." In some embodiments, the secure processor 126 may include a trusted measurement service to perform attestation to ensure that all system components are authorized. For example, the secure processor 126 may include a Trusted Execution Technology (TXT) component (not shown) to create a cryptographically unique identifier for each approved launch-enabled component of the cloudlet 102, and then provide hardware-based enforcement mechanisms to block the launch of code that does not match approved code. The TXT component may be implemented by an ACM, for example. In some embodiments, the secure processor 126 may be an x86 processor.

The cloudlet 102 may include a Basic Input/Output System (BIOS) 122, which may in turn include Option Read-Only Memory (OROM) 124. The BIOS 122 may be Unified Extensible Firmware Interface (UEFI) BIOS and the OROM 124 may be UEFI OROM. The OROM 124 may be implemented as firmware loaded by the BIOS 122, and may be used by the BIOS 122 to enable the ME 108 and the IE 112 to read data in the SES 156, as discussed below. The BIOS 122 may be authenticated by the ME 108. In some embodiments, the BIOS 122 may implement signature verification of the OROM 124 (e.g., UEFI OROM), as well as for the OS bootloader and the OS images in the cloudlet 102. For example, a UEFI secure boot process may be used by an operator of the cloudlet 102 to provide OS bootloader and OS signing and verification at boot, and the UEFI authentication variables (e.g., platform key (PK), KEK, signatures database (DB), and forbidden signatures database (DBX)) may be stored in a secure portion of the host storage 154 (e.g., an anti-rollback partition on an embedded Multimedia Card (eMMC) or in Universal Flash Storage (UFS)). In some embodiments, the OROM 124 may be a UEFI loadable module controlled by the IE 112 and stored in the SPI Flash memory 150. In some embodiments, the payload of the OROM 124 may be responsible for primary host storage management and/or update.

The BIOS 122 may use keys provisioned to the cloudlet 102 by the operator (e.g., the SES-KEK 114) as part of its authenticated variables. In some embodiments, the BIOS 122 may store the authenticated variables in a separate partition of the SES 156. In some embodiments, the BIOS 122 may store the authenticated variables in a secure storage partition of the main storage 152 (as discussed below) with access only by the platform root-of-trust (e.g., the ME 108).

The host OS/VMM 128 may include a Cloud Integrity Technology (CIT) agent 130. The CIT agent 130 may interact with a trusted measurement service of the secure processor 126 (e.g., TXT) to enable launch-time measurements of the BIOS 122, the OS and VMM of the host OS/VMM 128, and any VNFs 136, VMs 138, or containers 117 that are launched. In some embodiments, the Boot Guard 160, the CIT agent 130, and the trusted measurement service of the secure processor 126 (e.g., TXT) may together provide trusted, verified, and measured boot all the way to the applications or services running on the cloudlet 102.

In some embodiments, as discussed in detail below with reference to FIGS. 5-8, the cloudlet 102 may perform a secure and trusted boot process. This boot process may include releasing the SES-KEK 114 to the SES 156 to complete the boot process. Multiple ones of the security components discussed herein may be leveraged during this boot process, as discussed in detail below, including the Boot Guard component 160, the BIOS 122, and the OS of the host OS/VMM 128.

The cloudlet 102 may include one or more Network Interface Controllers (NICs)/switches 120. The NICs/switches 120 may be in communication with the host OS/VMM 128 and the IE 112, and may route data to/from the cloudlet 102. In some embodiments, all firmware and configuration information installed into the NICs/switches 120 may be verified by the ME 108, the IE 112, and/or the trusted measurement service of the secure processor 126 (e.g., SGX). These firmware and configuration elements may be stored in the SES 156. In some embodiments, the NICs/switches 120 may be part of the main processor of the cloudlet 102 (e.g., in the Central Processing Unit (CPU) North complex) or in a chipset (e.g., the Platform Controller Hub (PCH) or South complex). In some embodiments, the NICs/switches 120 may be implemented in an FPGA programmable logic module. In some embodiments, the NICs/switches 120 may be external to the cloudlet 102, and located on a Peripheral Component Interconnect Express (PCIe), optical, or other high-speed bus. In some embodiments, the NICs/switches 120 and the cloudlet 102 may be manufactured by different manufacturers.

The cloudlet 102 may include firmware storage 140 and main storage 152. In some embodiments, the firmware storage 140 may include Serial Peripheral Interface (SPI) Flash memory 150, but may alternatively or additionally include an eMMC, for example. The SPI Flash memory 150 may include BIOS firmware storage 142 (for the BIOS 122), ME firmware storage 144 (for the ME 108), IE firmware storage 146 (for the IE 112), NIC firmware storage 162 (for the NICs/switches 120), and OROM firmware storage 148 (for the OROM 124). The SPI Flash memory 150 may provide storage for the primary platform storage (e.g., storing UEFI platform configuration parameters).

The main storage 152 may include storage 158 for the host OS cloud services, and storage 154 for the host. The main storage 152 may store the image of the host OS, and all images stored in the main storage 152 may be stored in an encrypted fashion. The host storage 154 may include one or more SES 156; although referred to in the singular, the SES 156 may include one or more SES devices. The SES 156 may include a memory device (e.g., a hard drive) and a hardware circuit that encrypts/decrypts data as it is written to/from the memory device. The encryption/decryption of data in the memory device is performed using a Media Encryption Key (MEK), which is itself encrypted by a KEK. For example, the KEK for the SES 156 is the SES-KEK 114 in the IE 112. The SES 156 may be used for the OS. Although illustrated separately in FIG. 1, in some embodiments, the SES 156 may be used for platform firmware. In some embodiments, the main storage 152 may have dual redundant partitions so that if a partition fails, the cloudlet 102 can revert back to its redundant partition.

In some embodiments, the SES 156 may be divided into partitions, and the IE 112 and/or the ME 108 may unlock these partitions incrementally as needed (e.g., using different KEKs). The KEKs (e.g., the SES-KEK 114) may always be secured within the IE 112 and/or the ME 108 (or other trusted environments), and programmed into the SES 156 as needed. In some embodiments, each storage partition may have its own unique encryption KEK. In some embodiments, a KEK (e.g., the SES-KEK 114) may be securely wrapped by the IE 112 and/or the ME 108, and delivered to a security command center of the operator or infrastructure owner of the cloudlet 102. The security command center may use the wrapped KEK for audits and escrow, for example.

The main storage 152 and/or the firmware storage 140 may be secure storage, such as secure rollback protected eMMC and/or secure Flash partitions. This secure storage may be used to store platform firmware, the OS bootloader, and OS components, for example. In some embodiments, the secure storage of the cloudlet 102 may be used to store platform firmware, the OS bootloader, and/or OS-identifying information that may be used to check that the correct versions are in place. Examples of such OS-identifying information include versions, security versions, the composition of the OS (e.g., the Openstack image, storage, and networking services), authorized signers, and authenticated variables, among others. A "version" may refer to an accounting value that differentiates between different editions of a piece of software. A "security version" may refer to a value that is changed when a security policy violation is detected in the software, firmware, or other related component. For example, a piece of software may have a security version of 1 until a security issue is found, at which point the security version may be updated to 2 (and all security versions prior to this new security version may be considered vulnerable). An "authenticated variable" may refer to a security signature database variable, such as a signing key, an authorization database, a key hierarchy, update logs, etc. When the BIOS 122 is a UEFI BIOS, these authenticated variables are defined by UEFI. In some embodiments, the secure storage may be cryptographically bound to the platform hardware roots-of-trust (e.g., the ME 108, the IE 112, and/or the trusted measurement service of the secure processor 126 (e.g., SGX)). The secure storage may be tied to the platform of the cloudlet 102, and in some embodiments, any physical tampering may make the platform unbootable. In some embodiments, the platform of the cloudlet 102 may not boot without the secure storage.

As illustrated in FIG. 1, the cloudlet 102 may be in communication with one or more additional cloudlets 102. These additional cloudlets 102 may be configured in accordance with any of the embodiments discussed above. In some embodiments, the cloudlet 102 may not be in communication with any other cloudlets 102. The cloudlet 102 may also be in communication with a cloudlet management center 106 (which may also be referred to as a cloudlet control center) via the Internet 104. The Internet 104 may consist of network equipment, Internet connections, backbone fibers, or any other network hardware coupling the cloudlet 102 to the cloudlet management center 106. In some embodiments, one or more cloudlets 102 may be in communication with one or more network infrastructure components 119, such as a top-of-rack switch or router.

The cloudlet management center 106 may provide an infrastructure-as-a-service (IAAS) for managing the cloudlets 102 in the system 100. Use of the cloudlet management center 106 to manage the cloudlets 102 may allow the system 100 to be implemented with a low total cost of ownership (TCO) and large scale deployment capability. In some embodiments, the cloudlet management center 106 may include installation and configuration management circuitry to provision the cloudlet 102 with appropriate software and configuration information. When the host OS or applications running on the cloudlet 102 are to be updated, remote management and telemetry circuitry in the cloudlet management center 106 may use a dedicated out-of-band mechanism to communicate with the cloudlet 102. For example, one port of the NICs/switches 120 may be assigned to operate as this out-of-band mechanism and may provide a secure and reliable channel between the cloudlet 102 and the cloudlet management center 106. A new image including the updates may be pushed down to the cloudlet 102 by the cloudlet management center 106, and the IE 112 may invoke the OROM 124 to provide access by the IE 112 to the SES 156 in the main storage 152 for storing the new image. While a new image is pushed down to the cloudlet 102 via the out-of-band mechanism, the host OS/VMM 128 may continue to run, thus minimizing the downtime incurred by updates. In other embodiments, a direct connection may exist between the IE 112 and the main storage 152, and/or between the ME 108 and the main storage 152 (e.g., the main storage 152 may include multiple heads for communication with the IE 112 and the ME 108). In this manner, a controller for the main storage 152 may enable the host OS/VMM 128, the IE 112, and/or the ME 108 to act as different "agents" to connect to the main storage 152 and use it for read/write.

In some embodiments, the OS image on multiple ones of the cloudlets 102 included in the system 100 may be identical, and the identity of the cloudlet 102 may be determined by a configuration file hosted on a secure pseudo-Universal Serial Bus (USB) (or pseudo-PCIe) device. A pseudo-device may provide a set of device-like operations without the hardware typically associated with such a device, to enhance the functionality of an existing device or access a sub-system of the cloudlet 102. In some embodiments, a pseudo-device may be implemented by a pseudo-device driver, which may be a part of the kernel that acts like a device driver but does not correspond to any "actual" device hardware in the cloudlet 102. In particular, a secure and trusted boot process (such as the processes discussed below with reference to FIGS. 5-8) may be built upon to expose the configuration information as a pseudo-device on a USB (or PCIe) bus, and to have the IE 112 securely update the information on the device. In some embodiments, such embodiments may include having the OROM 124 mount the relevant storage as a USB or PCIe device, and having a USB or PCIe redirect controller in the IE 112. The presence of encrypted at-rest storage may limit the risk of physical attacks.

Figure 2:
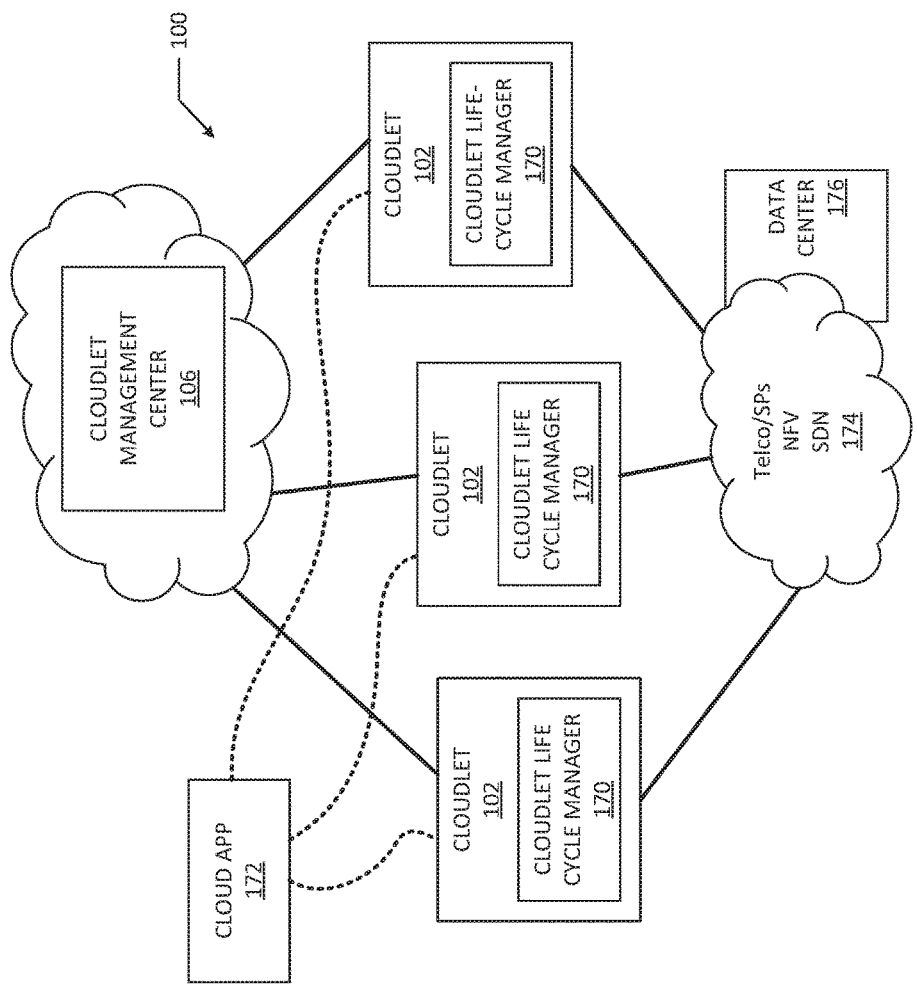
FIG. 2 is a block diagram of a networked computing system including cloudlet lifecycle managers in one or more cloudlets, in accordance with various embodiments.

FIG. 2 is a block diagram of a networked computing system 100 including cloudlet lifecycle managers 170 in one or more cloudlets 102, in accordance with various embodiments. The cloudlet lifecycle managers 170 may be embedded in the cloudlets 102. In some embodiments, a cloudlet lifecycle manager 170 of a cloudlet 102 may be located in the IE 112. As shown in FIG. 2, each of the cloudlets 102 may be in communication with the cloudlet management center 106. In particular, the cloudlet lifecycle managers 170 may be in communication with the installation and configuration management circuitry and the remote management and telemetry circuitry of the cloudlet management center 106, discussed above. During operation, platform telemetry circuitry of the cloudlet 102 may be in communication with a telemetry hub included in the ME 108 (which, as discussed herein, may include a firmware TPM 118), and the ME 108 may communicate with the cloudlet lifecycle manager in the IE 112. Each cloudlet 102 may also be in communication with a cloud system 174 provided by telcos or other service providers to perform NFV and SDN operations. The cloud system 174 may have its own data center 176, which may take a conventional cloud computing data center form. Each of the cloudlets 102 may also be in communication with a cloud application distribution device 172, which may provide software for particular applications to the cloudlets 102.

The cloudlet lifecycle managers 170 may interact with the cloudlet management center 106 to allow for secure exchange between the cloudlet 102 and the cloudlet management center 106 without the possibility of man-in-the-middle or spoofing arrangements. For example, in some embodiments, the cloudlet lifecycle manager 170 may emulate a read-only device and may expose that emulated read-only device to a main server (e.g., the cloudlet management center 106 or a head cloudlet 102 in the system 100). This emulated device may include configuration parameters, which may be exposed as files or other data forms known to the operating application software on the main server. The cloudlet lifecycle manager 170 may expose Application Programming Interfaces (APIs) to the cloudlet management center 106 to allow secure updates of the content of the emulated device. The cloudlet lifecycle manager 170 may thus provide a node configuration pseudo-device.

In another example, in some embodiments, the cloudlet lifecycle manager 170 may emulate a logging device and may expose that emulated read-only device to a main server. Information written to that device may be securely presented as logger diagnostic information by the cloudlet lifecycle managers 170 to the cloudlet management center 106. The cloudlet lifecycle manager 170 may filter log information sent to the cloudlet management center 106 based on configuration or policy settings from the cloudlet management center 106.

In another example, once the platform of a cloudlet 102 has been fully verified, the cloudlet 102 may expose an out-of-band attestation level to an external system. This out-of-band attestation level may represent the measured security of the cloudlet 102. For example, a "five-star" attestation level may represent that the firmware, OS boot, keys, and configuration of the cloudlet 102 are as expected. A "four-star" attestation level may represent that the cloudlet 102 is mostly, but not completely, as expected (e.g., the firmware is a version behind). A "0-star" attestation level may represent a complete failure (e.g., the measured boot does not match the expected value).

In some embodiments, the cloudlet lifecycle manager 170 may communicate with the remote management and telemetry circuitry of the cloudlet management center 106 via a RESTful interface. This interface may use a JavaScript object notation (JSON) data format, and in some embodiments, may be a secure hypertext transfer protocol (HTTPS) interface (e.g., in accordance with the X.509 standard for client/server authentication).

Figure 3:
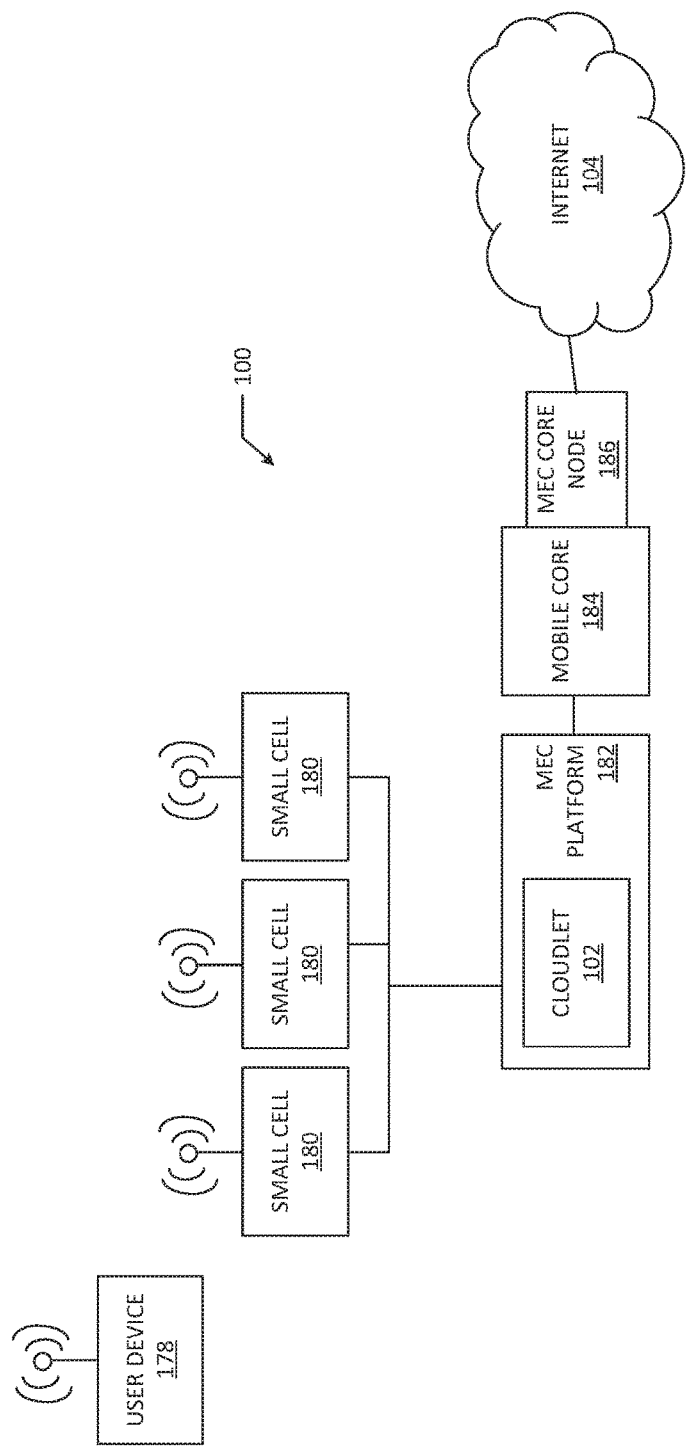
FIG. 3 is a block diagram of a networked computing system for mobile edge computing (MEC) including a cloudlet, in accordance with various embodiments.

As noted above, in some embodiments, the cloudlets 102 disclosed herein may be included in a MEC arrangement. FIG. 3 is a block diagram of a networked computing system 100 for mobile edge computing (MEC) including a cloudlet 102, in accordance with various embodiments. In the system 100 of FIG. 3, the user device 178 may represent any end device, such as a smart phone, other personal computing device, Internet of Things (IoT) device, vehicle, or sensor. A single user device 178 is shown for ease of illustration, and the system 100 may include multiple user devices 178. The small cells 180 may communicate with the user device 178 and may represent small wireless network hubs (e.g., a Wi-Fi hub, a Third Generation Partnership Project (3GPP) antenna, etc.). The small cells 180 may be coupled to a MEC platform 182, which may include the cloudlet 102 in accordance with any of the embodiments disclosed herein. Termination may be performed at the MEC platform 182, and the cloudlet 102 may provide VNFs 136 for cell phone termination, signaling, data plane, and applications. The MEC platform 182 may be in communication with the mobile core 184, which may have a MEC core node 186. The communication between the MEC platform 182 and the mobile core 184 may include backhaul links, routers, switches, and any other suitable hardware, as known in the art. The mobile core 184 may include, for example, an LTE backbone network. The MEC core node 186 may then be in communication with the Internet 104, which may in turn be coupled with any of a number of services (not shown), such as content delivery, content analytics, vehicle monitoring, monitoring of other sensors, emergency services, etc. This architecture may be contrasted with traditional mobile networks, in which the small cells 180 are coupled to the mobile core 184 via an eNB that does not have the ability to provide cloud computing services.

Figure 4:
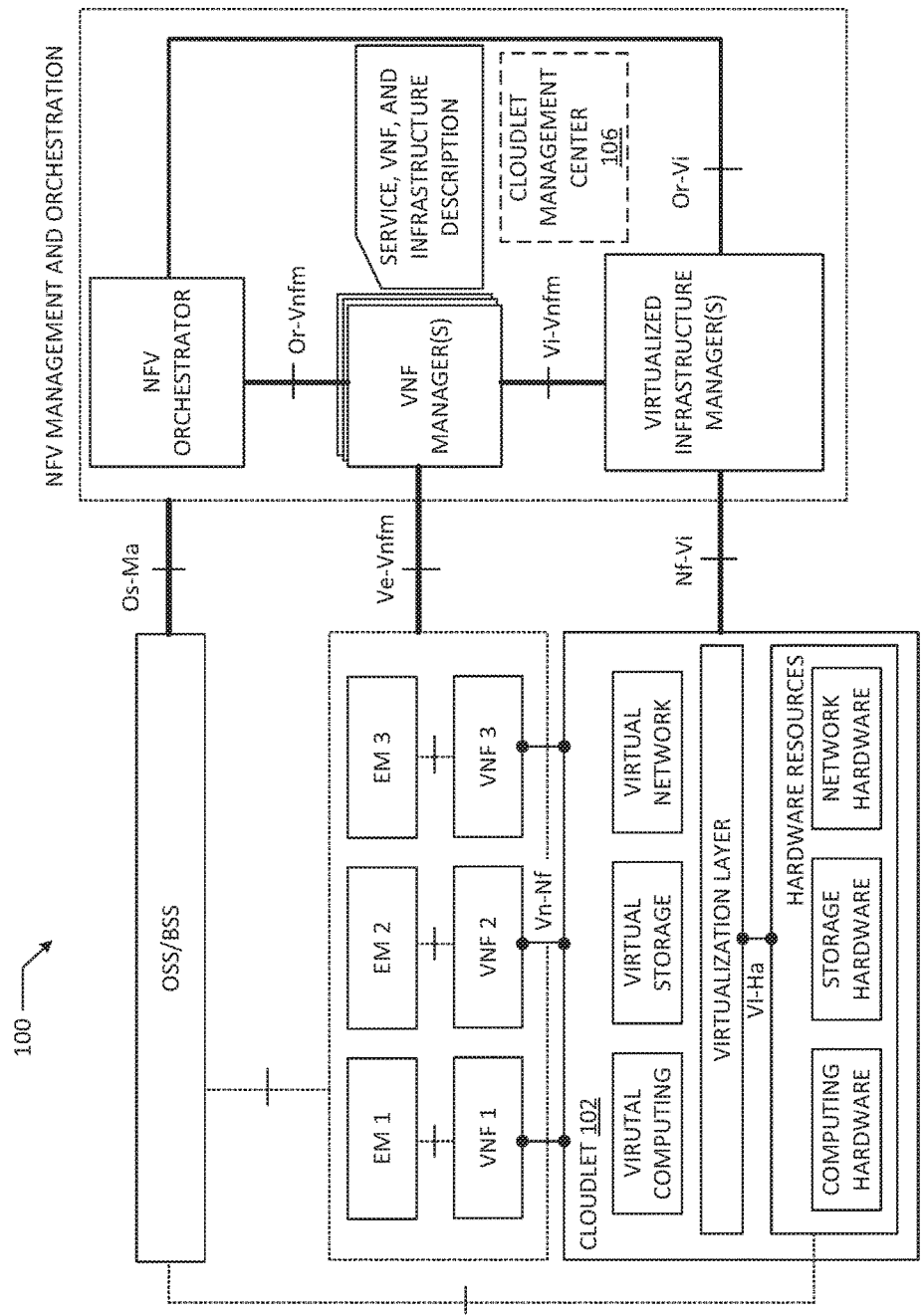
FIG. 4 is a block diagram of a networked computing system for network function virtualization (NFV) including a cloudlet, in accordance with various embodiments.

FIG. 4 is a block diagram of a networked computing system 100 for network function virtualization (NFV) including a cloudlet 102, in accordance with various embodiments. In the system 100 of FIG. 4, the cloudlet 102 may serve the role of NFV Infrastructure (NFVI), and the cloudlet management center 106 may be included in the NFV Management and Orchestration (NFV MANO) component. In some embodiments, all of the components of the cloudlet 102 of FIG. 1 may be included in the NFVI, with the exception of the openstack services 134, the VNFs 136, the workload VMs 138, and the containers 117.

Figure 5:
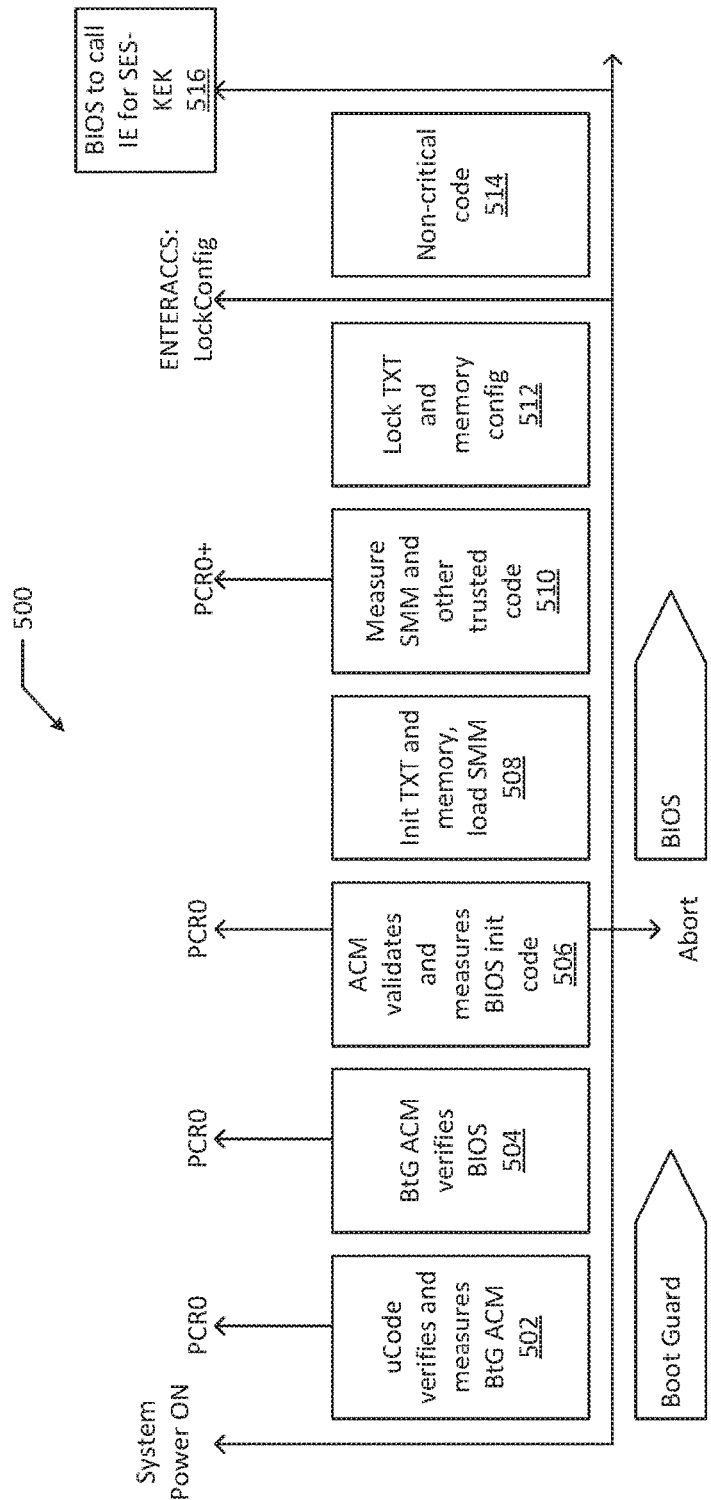
FIG. 5 illustrates a first phase of a trusted boot process, in accordance with various embodiments.
Figure 6:
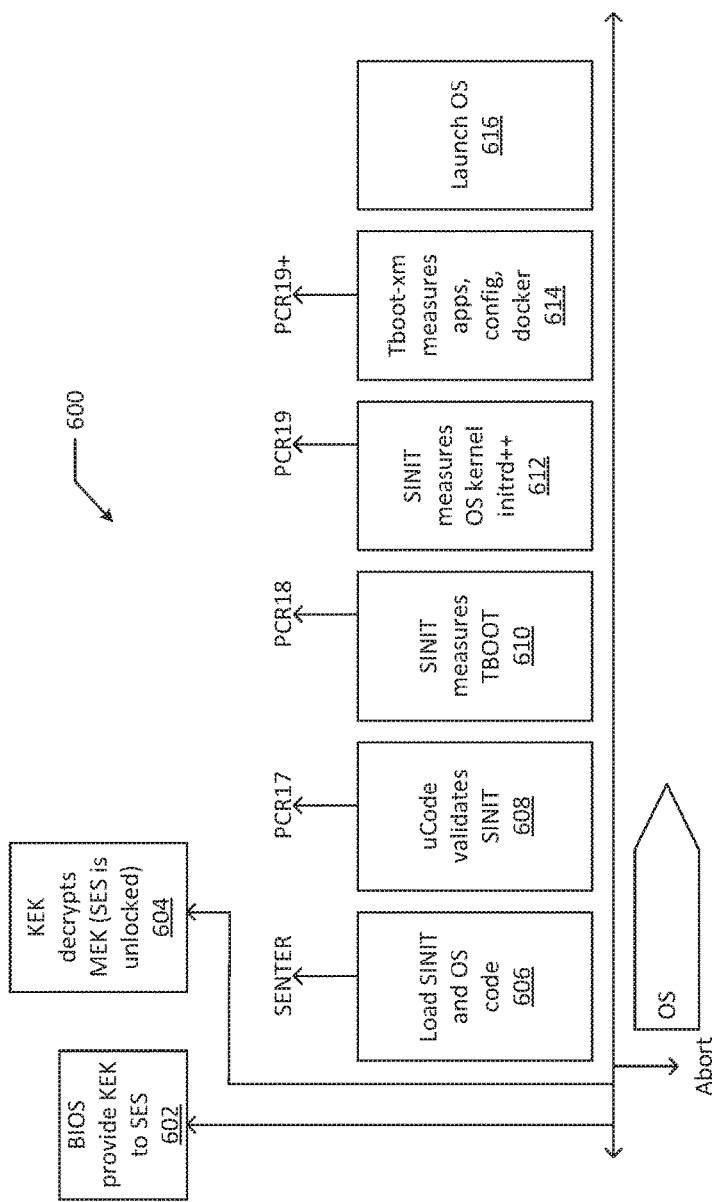
FIG. 6 illustrates a second phase of a trusted boot process, in accordance with various embodiments.
Figure 7:
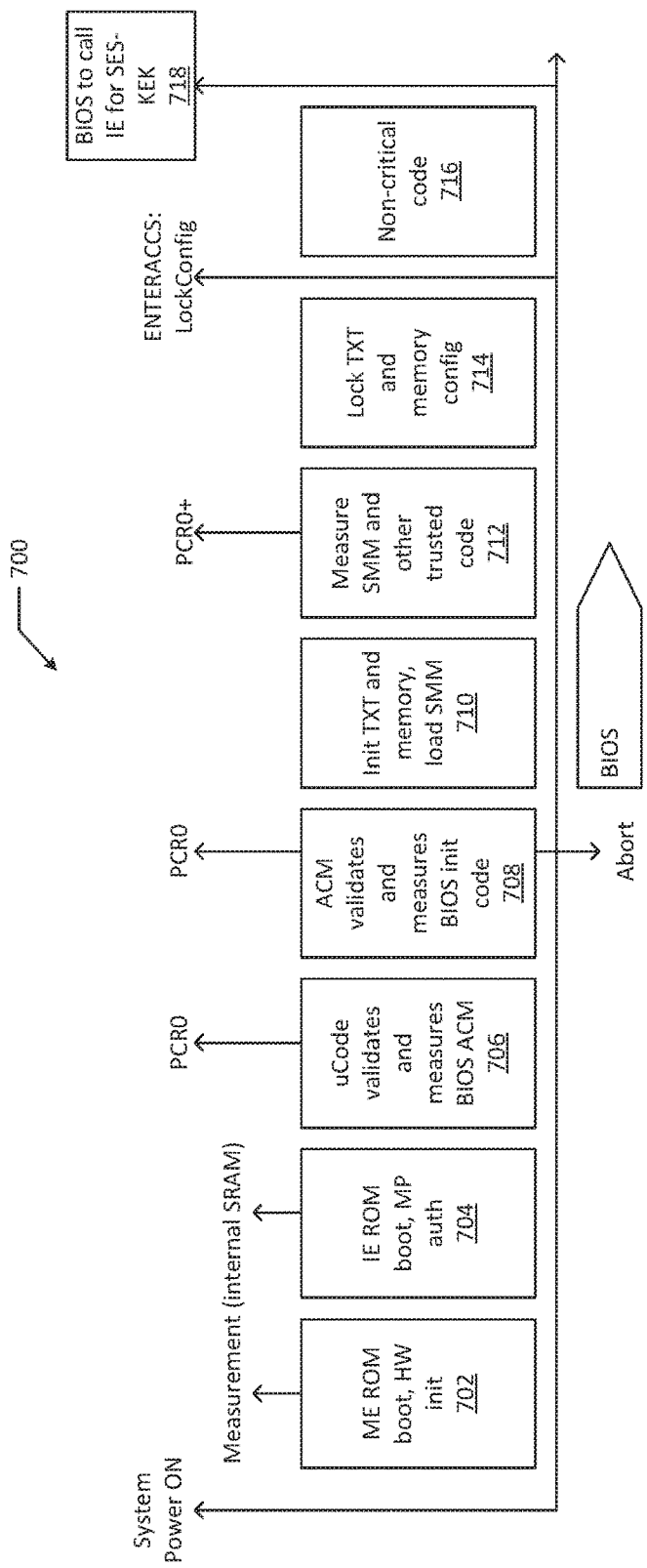
FIG. 7 illustrates a first phase of a trusted boot process including root-of-trust measurement, in accordance with various embodiments.
Figure 8:
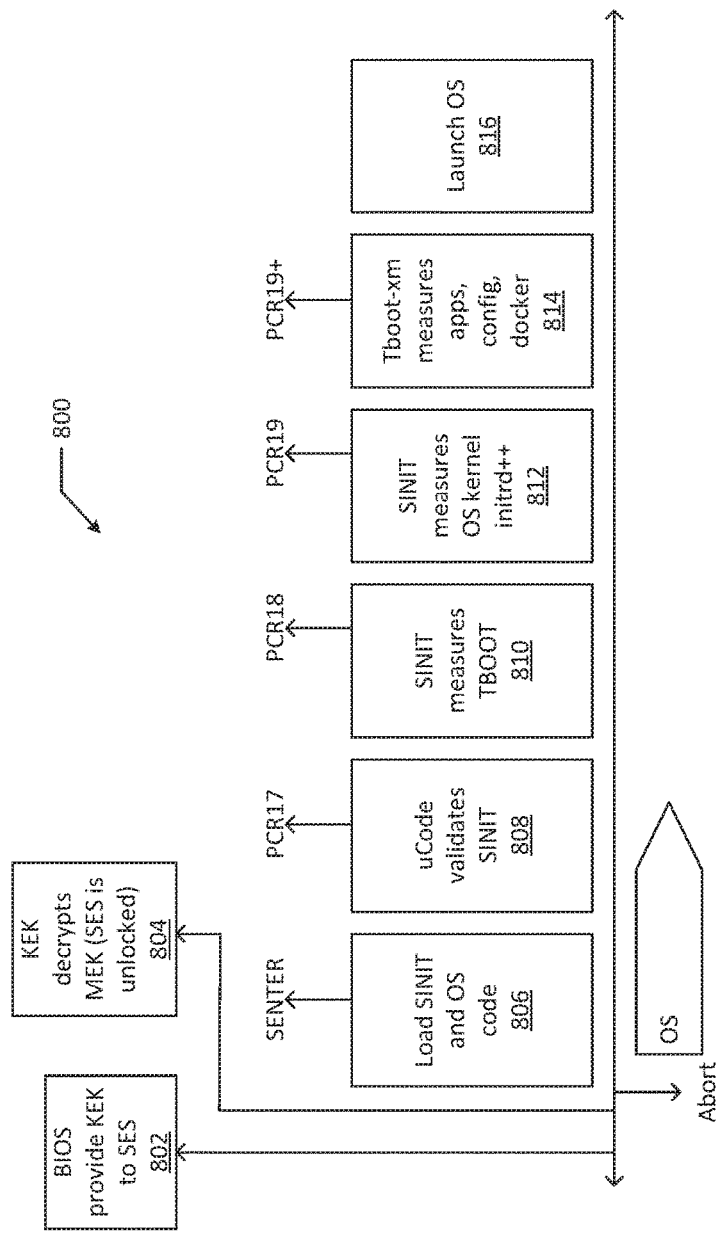
FIG. 8 illustrates a second phase of a trusted boot process including root-of-trust measurement, in accordance with various embodiments.

As noted above, in some embodiments, the cloudlet 102 may perform a secure and trusted boot process. This boot process may include releasing the SES-KEK 114 to the SES 156 to complete the boot process. FIGS. 5 and 6 illustrate first and second phases, respectively, of a first embodiment of a trusted boot process, and FIGS. 7 and 8 illustrate first and second phases, respectively, of a second embodiment of a trusted boot process.

In the trusted boot processes of FIGS. 5-8, the SES-KEK 114 associated with the SES 156 is protected by the ME 108 and the IE 112, and when applicable, may be passed to the BIOS 122. Upon successful authentication and authorization, the SES-KEK 114 may be provided to the SES 156 for self-decryption and unlocking. The BIOS 122 may have to pass sign-verification checks originating from the ME 108 and/or the IE 112, as well as measurement checks, before receiving the SES-KEK 114. The BIOS 122 may include mechanisms to access and unlock the SES 156. In some embodiments, the BIOS operations described above may be performed by a UEFI BIOS System Management Interrupt (SMI)-based System Management Mode (SMM) mode. In some such embodiments, the code executing in the SMM may be trusted and verified by the ME 108 and/or the IE 112 as a root-of-trust.

Turning to FIG. 5, a first phase 500 of a trusted boot process is illustrated, in accordance with various embodiments. As discussed below, the first phase 500 may be a measurement and verification phase for the hardware and BIOS. After the system powers on, at 502, microcode may verify and measure the authenticated code module (ACM) of the Boot Guard (BtG) 160. The result may be written to a platform configuration register (PCR). At 504, the ACM of the Boot Guard 160 may verify the BIOS 122, and the result may be written to a PCR. At 506, the ACM may validate and measure the initialization code of the BIOS 122. The result may be written to a PCR; if the validation fails, the process may be aborted. At 508, the trusted measurement service of the secure processor 126 (e.g., TXT) and its memory may be initialized, and the SMM may be loaded. At 510, the SMM and other trusted code may be measured and the result written to a PCR. At 512, the configuration of the trusted measurement service (e.g., TXT) and its memory may be locked by providing an ENTERACCS:LockConfig instruction. At 514, non-critical code may be executed. At 516, the BIOS 122 may communicate with the IE 112 to get the SES-KEK 114 for the locked SES 156.

The second phase 600 illustrated in FIG. 6 may be a measurement phase for various other components (e.g., Trust Boot (TBOOT), OS, docker engine, etc.). TBOOT, for example, may be a "pre-kernel" component that may call TXT instructions to measure the OS or VMMs. Turning to FIG. 6, at 602, the BIOS 122 may provide the SES-KEK 114 to the SES 156. At 604, the SES 156 may use the SES-KEK 114 to decrypt the MEK of the SES 156, and thereby unlock the SES 156. If the unlocking of the SES 156 fails, the process may be aborted. At 606, the SINIT and OS code may be loaded, and an SENTER instruction may be provided (as part of the TXT process, as known in the art). At 608, microcode may validate the SINIT of 606, and the result may be written to a PCR. At 610, SINIT may measure TBOOT, and the result may be written to a PCR. At 612, SINIT may measure the OS kernel initrd++, and the result may be written to a PCR. At 614, Tboot-xm may measure applications, configuration data, a docker daemon, and/or other OS components, and the result may be written to a PCR. The components measured at 614 may be configurable. At 616, the OS may be launched.

The trusted boot process illustrated in FIGS. 5 and 6 may provide remote secure access to the platform of the cloudlet 102, with this access including authorization credentials that enable the ME 108 and/or the IE 112 to unlock the SES 156. The SES-KEK 114 may never be visible to the protected firmware, or be extracted under normal circumstances. In some embodiments, for operator regulatory compliance, the KEKs of the cloudlet 102 may be retrieved using highly privileged authorization. For example, the IE 112 and/or the ME 108 may be provisioned in advance with authorization credentials that may be used for delivering the KEKs securely out to a management entity (e.g., an NFV virtualized infrastructure manager, as illustrated in FIG. 4).

FIGS. 7 and 8 illustrate first and second phases, respectively, of a second embodiment of a trusted boot process. In the trusted boot process illustrated in FIGS. 7 and 8, the roots-of-trust (e.g., the ME 108 and the IE 112) are also measured. This may be suitable for secure auditing and regulatory compliance to ensure that the platform of the cloudlet 102 is booted with a known set of root-of-trust firmware/OS and with a known root-of-trust configuration.

As discussed below, the first phase 700 may be a measurement and verification phase for the hardware and BIOS. Turning to the first phase 700 of FIG. 7, after the system powers on, at 702, ME ROM boot (e.g., the ME 108) and hardware initialization may be performed, and a measurement may be stored in internal SRAM (e.g., when the TPM 118 is not yet ready). At 704, IE ROM boot (e.g., the IE 112) and Multi-Party Authorization (e.g., the Multi-Party Authorization component 116) may be performed, and a measurement may be stored in internal SRAM (e.g., when the TPM 118 is not yet ready). At 706, microcode may validate and measure the ACM of the BIOS 122, and the result may be written to a PCR. At 708, the ACM may validate and measure the initialization code of the BIOS 122. The result may be written to a PCR; if the validation fails, the process may be aborted. At 710, the trusted measurement service of the secure processor 126 (e.g., TXT) and its memory may be initialized, and the System Management Mode (SMM) may be loaded. The SMM may be a mode in which OS execution is suspended and trusted firmware is executed, as known in the art. At 712, the SMM and other trusted code may be measured, and the result written to a PCR. At 714, the configuration of the trusted measurement service (e.g., TXT) and its memory may be locked, and an ENTERACCS:LockConfig instruction may be provided. At 716, non-critical code may be executed. At 718, the BIOS 122 may communicate with the IE 112 to get the SES-KEK 114 for the locked SES 156.

The second phase 800 illustrated in FIG. 8 may be a measurement phase for various other components (e.g., TBOOT, OS, docker engine, etc.). Turning to FIG. 8, at 802, the BIOS 122 may provide the SES-KEK 114 to the SES 156. At 804, the SES 156 may use the SES-KEK 114 to decrypt the MEK of the SES 156, and thereby unlock the SES 156. If the unlocking of the SES 156 fails, the process may be aborted. At 806, the SINIT and OS code may be loaded, and an SENTER instruction may be provided. At 808, microcode may validate the SINIT of 806, and the result may be written to a PCR. At 810, SINIT may measure TBOOT, and the result may be written to a PCR. At 812, SINIT may measure the OS kernel initrd++, and the result may be written to a PCR. At 814, Tboot-xm may measure applications, configuration, and docker data, and the result may be written to a PCR. The components measured at 814 may be configurable. At 816, the OS may be launched.

Figure 9:
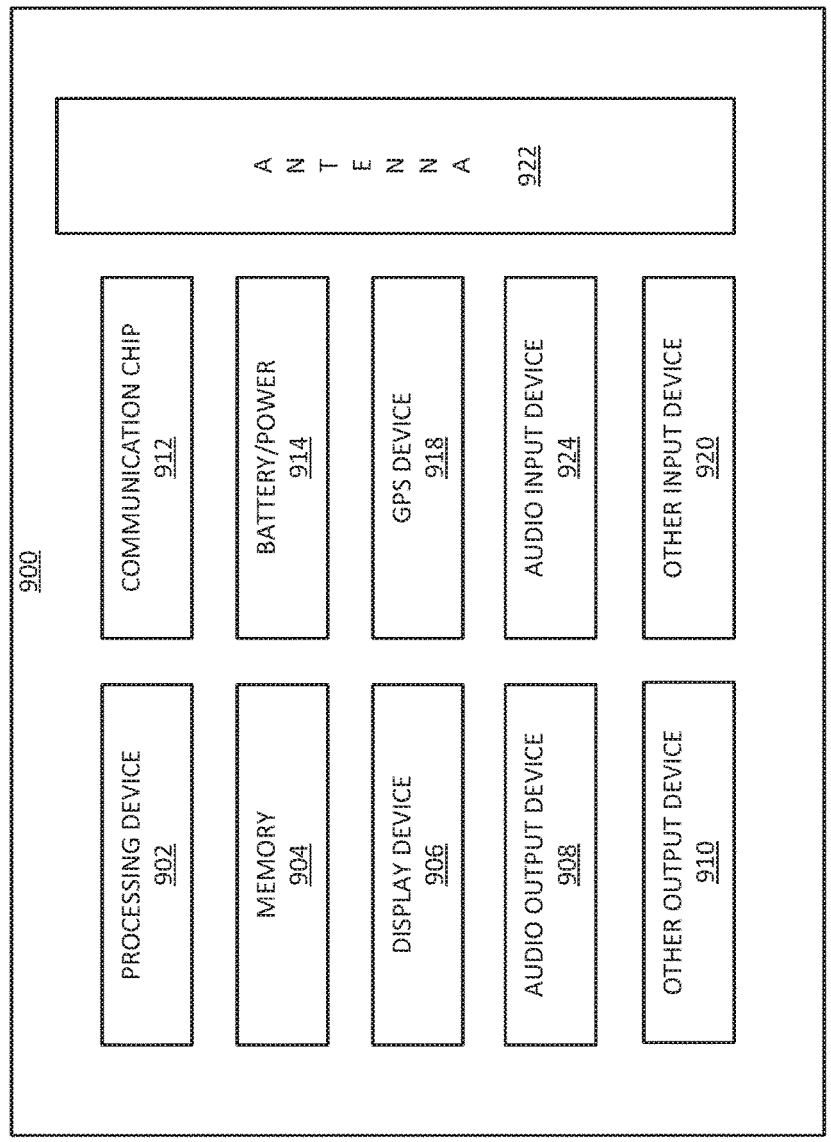
FIG. 9 is a block diagram of a computing device that may be used to implement various components of the networked computing systems disclosed herein, in accordance with various embodiments.

FIG. 9 is a block diagram of a computing device 900 that may be used to implement various components of the networked computing systems disclosed herein, in accordance with various embodiments. For example, some or all of the components of the computing device 900 may be included in the cloudlet 102, the cloudlet management center 106, the user device 178, or the cloud application distribution device 172. A number of elements are illustrated in FIG. 9 as included in the computing device 900, but any one or more of these elements may be omitted or duplicated, as suitable for the application.

Additionally, in various embodiments, the computing device 900 may not include one or more of the elements illustrated in FIG. 9, but the computing device 900 may include interface circuitry for coupling to the one or more elements. For example, the computing device 900 may not include a display device 906, but may include display device interface circuitry (e.g., a connector and driver circuitry) to which a display device 906 may be coupled. In another set of examples, the computing device 900 may not include an audio input device 924 or an audio output device 908, but may include audio input or output device interface circuitry (e.g., connectors and supporting circuitry) to which an audio input device 924 or audio output device 908 may be coupled.

The computing device 900 may include a processing device 902 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 902 may include one or more digital signal processors (DSPs), application-specific integrated circuits (ASICs), central processing units (CPUs), graphics processing units (GPUs), cryptoprocessors, server processors, or any other suitable processing devices. For example, the processing device 902 may include the secure processor 126, and the separate processors included in the ME 108 and the IE 112, of the cloudlet 102. The computing device 900 may include a memory 904, which may itself include one or more memory devices such as volatile memory (e.g., dynamic random access memory (DRAM)), non-volatile memory (e.g., read-only memory (ROM)), flash memory, solid state memory, SES, and/or a hard drive. For example, the memory 904 may include the firmware storage 140 and the main storage 152 of the cloudlet 102.

In some embodiments, the computing device 900 may include a communication chip 912 (e.g., one or more communication chips). For example, the communication chip 912 may be included in the NICs/switches 120 of the cloudlet 102. For example, the communication chip 912 may be configured for managing wireless communications for the transfer of data to and from the computing device 900. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 912 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 912 may operate in accordance with a Global System for Mobile communication (GSM), General Packet Radio Service (GPRS), Universal Mobile Telecommunications System (UMTS), High Speed Packet Access (HSPA), Evolved HSPA (E-HSPA), or LTE network. The communication chip 912 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 912 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 912 may operate in accordance with other wireless protocols in other embodiments. The computing device 900 may include an antenna 922 to facilitate wireless communications and/or to receive other wireless communications (such as AM or FM radio transmissions).

In some embodiments, the communication chip 912 may manage wired communications, such as electrical, optical, or any other suitable communication protocols (e.g., the Ethernet). As noted above, the communication chip 912 may include multiple communication chips. For instance, a first communication chip 912 may be dedicated to shorter-range wireless communications such as Wi-Fi or Bluetooth, and a second communication chip 912 may be dedicated to longer-range wireless communications such as a global positioning system (GPS), EDGE, GPRS, CDMA, WiMAX, LTE, EV-DO, or others. In some embodiments, a first communication chip 912 may be dedicated to wireless communications, and a second communication chip 912 may be dedicated to wired communications.

The computing device 900 may include battery/power circuitry 914. The battery/power circuitry 914 may include one or more energy storage devices (e.g., batteries or capacitors) and/or circuitry for coupling elements of the computing device 900 to an energy source separate from the computing device 900 (e.g., AC line power).

The computing device 900 may include a display device 906 (or corresponding interface circuitry, as discussed above). The display device 906 may include any visual indicators, such as a heads-up display, a computer monitor, a projector, a touchscreen display, a liquid crystal display (LCD), a light-emitting diode display, or a flat panel display, for example.

The computing device 900 may include an audio output device 908 (or corresponding interface circuitry, as discussed above). The audio output device 908 may include any device that generates an audible indicator, such as speakers, headsets, or earbuds, for example.

The computing device 900 may include an audio input device 924 (or corresponding interface circuitry, as discussed above). The audio input device 924 may include any device that generates a signal representative of a sound, such as microphones, microphone arrays, or digital instruments (e.g., instruments having a musical instrument digital interface (MIDI) output).

The computing device 900 may include a global positioning system (GPS) device 918 (or corresponding interface circuitry, as discussed above). The GPS device 918 may be in communication with a satellite-based system and may receive a location of the computing device 900, as known in the art.

The computing device 900 may include an other output device 910 (or corresponding interface circuitry, as discussed above). Examples of the other output device 910 may include an audio codec, a video codec, a printer, a wired or wireless transmitter for providing information to other devices, or an additional storage device.

The computing device 900 may include an other input device 920 (or corresponding interface circuitry, as discussed above). Examples of the other input device 920 may include an accelerometer, a gyroscope, an image capture device, a keyboard, a cursor control device such as a mouse, a stylus, a touchpad, a bar code reader, a Quick Response (QR) code reader, any sensor, or a radio frequency identification (RFID) reader.

Although particular examples of trusted execution environments are discussed herein (e.g., the ME 108 and the IE 112), this is simply for illustrative purposes, and the embodiments disclosed herein may be implemented using any desired trusted partitions or environments, such as SGX or SMM mode.

In some embodiments of the cloudlet 102, the ME 108, the IE 112, the secure processor 126 (e.g., using SGX and/or TXT), the SES 156, the Boot Guard component 160, and the CIT agent 130 may be used together to ensure that the firmware of the platform of the cloudlet 102, and the OS bootstrap operation for the cloudlet 102, are protected (e.g., by the ME 108 and the IE 112) and the SES-KEK 114 (and any other KEKs) are stored and protected (e.g., by the ME 108 and the IE 112). The result is a trusted and verified boot, and authenticated key access, that is protected by hardware.

In some embodiments of the cloudlet 102, the ME 108, the IE 112, the secure processor 126 (e.g., using SGX), UEFI Secure Boot (in which the firmware of the cloudlet 102 checks that the system boot loader is signed with a key authorized by a database contained in the firmware), Secure Fuses (in which a key required for boot (e.g., an initial set of public key hashes) is permanently burned into fuses in hardware to provide a hardware root-of-trust), Secure Packaging (in which packaging techniques are used that do not allow exposure of the keys stored in the Secure Fuses), and Secure eMMC/Storage (e.g., the use of storage with anti-rollback protection, such as a Replay Protected Memory Block (RPMB) in an eMMC) may be used together to ensure that the platform of the cloudlet 102 is booted and operational in a trusted environment, that configuration information is exposed as a pseudo USB (or PCIe) device on the cloudlet 102 is securely accessible and updatable, and that the configuration information is protected by the ME 108 and the IE 112.

In some embodiments of the cloudlet 102, the ME 108, the IE 112, the secure processor 126 (e.g., using SGX and/or TXT), the Boot Guard component 160, and the CIT agent 130 may be used together to provide a measured boot and chain of trust to ensure that the attestation of the cloudlet 102 (including the ME 108, the IE 112, and static and dynamic chains of trust) is secure (e.g., cannot be compromised), and that the out-of-band attestation level may be exposed to an external system.

In some embodiments of the cloudlet 102, the ME 108 and the IE 112 may be used together to host an embedded cloudlet lifecycle manager. The embedded cloudlet lifecycle manager may emulate a read-only device and may expose that emulated device to a main server. Additionally or alternatively, the embedded cloudlet lifecycle manager may emulate a logging device and may expose that emulated device to a main server.

Various ones of the embodiments disclosed herein may provide one or more advantages over conventional approaches. Some embodiments may provide a hardware-enforced integrity and chain of trust of an entire operating platform in an environment where physical security cannot be asserted. Some embodiments may provide a secure and tamperproof cloudlet that remains secure, trusted, and attested over the various phases of its platform lifecycle without needing the physical security of a data center. Some embodiments may provide an unspoofable visibility into the operational state and attested trust level of a cloudlet. Some embodiments may allow "open platform"-based NFV and SDN solutions to be deployed in a secure fashion at remote, unmanned, and unprotected sites. The solution may enable many use cases for operators (e.g., MEC and 5G) that could benefit from remote, secured, distributed, standalone data processing. Some embodiments may support 5G and/or IoT.

The following paragraphs provide examples of various ones of the embodiments disclosed herein.

Example 1 is a computing device, including: a trusted execution environment; a Basic Input/Output System (BIOS) to request a Key Encryption Key (KEK) from the trusted execution environment; and a Self-Encrypting Storage (SES) associated with the KEK; wherein the trusted execution environment is to verify the BIOS and provide the KEK to the BIOS subsequent to verification of the BIOS, and the BIOS is to provide the KEK to the SES to unlock the SES for access by the trusted execution environment.

Example 2 may include the subject matter of Example 1, and may further specify that the trusted execution environment is a root-of-trust for the computing device.

Example 3 may include the subject matter of any of Examples 1-2, and may further specify that the trusted execution environment includes operation in a mode in which execution of an operating system of the computing device is suspended.

Example 4 may include the subject matter of any of Examples 1-3, and may further specify that the computing device is a cloudlet.

Example 5 may include the subject matter of any of Examples 1-4, and may further specify that the trusted execution environment is to communicate with a remote management computing device to receive updates.

Example 6 may include the subject matter of Example 5, and may further specify that the trusted execution environment includes a lifecycle manager to communicate with the remote management computing device over a RESTful interface.

Example 7 may include the subject matter of Example 6, and may further specify that the lifecycle manager is to emulate a read-only device exposing configuration parameters to another computing device.

Example 8 may include the subject matter of Example 6, and may further specify that the lifecycle manager is to emulate a read-only device exposing log or diagnostic information to another computing device.

Example 9 may include the subject matter of any of Examples 1-8, further comprising Virtualized Network Function (VNF) logic.

Example 10 may include the subject matter of any of Examples 1-9, further comprising Virtual Machine (VM) logic.

Example 11 is a networked computing system, including: a cloudlet, including a trusted execution environment, a Basic Input/Output System (BIOS) to request a Key Encryption Key (KEK) from the trusted execution environment, and a Self-Encrypting Storage (SES) associated with the KEK, wherein the trusted execution environment is to provide the KEK to the BIOS, and the BIOS is to provide the KEK to the SES to unlock the SES for access by the trusted execution environment; and a cloudlet management center, remote from the cloudlet, in communication with the trusted execution environment.

Example 12 may include the subject matter of Example 11, and may further specify that the networked computing system is a Mobile Edge Computing (MEC) system.

Example 13 may include the subject matter of any of Examples 11-12, and may further specify that the networked computing system is a Fifth Generation Mobile Network (5G) system.

Example 14 may include the subject matter of any of Examples 11-13, and may further include multiple cloudlets in communication with the cloudlet management center.

Example 15 may include the subject matter of any of Examples 11-14, and may further specify that the trusted execution environment is an operator root-of-trust.

Example 16 may include the subject matter of any of Examples 11-15, and may further specify that the trusted execution environment is a manufacturer root-of-trust.

Example 17 may include the subject matter of any of Examples 11-16, and may further specify that the trusted execution environment is to receive an update image from the cloudlet management center while an operating system of the cloudlet continues to execute.

Example 18 is a method for secure storage access, including: verifying, by a trusted execution environment of a computing device, a Basic Input/Output System (BIOS) of the computing device; in response to verifying the BIOS, providing, by the trusted execution environment to the BIOS, a Key Encryption Key (KEK) for a Self-Encrypting Storage (SES) of the computing device; and providing, to the SES by the BIOS, the KEK to unlock the SES.

Example 19 may include the subject matter of Example 18, and may further specify that the SES includes a hard drive.

Example 20 may include the subject matter of any of Examples 18-19 wherein platform firmware is stored in the SES.

Example 21 is one or more non-transitory computer readable media having instructions thereon that, in response to execution by a Basic Input/Output System (BIOS) of a computing device, cause the computing device to: request a Key Encryption Key (KEK) for a Self-Encrypting Storage (SES) of the computing device; receive, from a trusted execution environment of the computing device in response to verification of the BIOS, the KEK; and provide the KEK to unlock the SES.

Example 22 may include the subject matter of Example 21, and may further specify that the SES is partitioned and providing the key to unlock the SES includes providing the key to unlock a partition of the SES associated with the KEK.

Example 23 may include the subject matter of any of Examples 21-22, and may further specify that firmware configuration information is stored in the SES.

Example 24 may include the subject matter of any of Examples 21-23, and may further specify that the SES is to use the KEK to unlock a Media Encryption Key (MEK), and the MEK encrypts data stored in the SES.

Example 25 may include the subject matter of any of Examples 21-24, and may further specify that the computing device is an edge server in a Mobile Edge Computing (MEC) network.

Example 26 is a computing device including: a trusted execution environment; a BIOS to request a KEK from the trusted execution environment; and an SES associated with the KEK; wherein the trusted execution environment is to verify the BIOS and provide the KEK to the BIOS subsequent to verification of the BIOS, and the BIOS is to provide the KEK to the SES to unlock the SES for access by the trusted execution environment.

Example 27 may include the subject matter of Example 26, and may further specify that the trusted execution environment includes an ME and/or an IE.

Example 28 may include the subject matter of any of Examples 26-27, and may further specify that the trusted execution environment includes an SMM.

Example 29 may include the subject matter of any of Examples 26-28, and may further specify that the computing device is a cloudlet.

Example 30 may include the subject matter of any of Examples 26-29, and may further specify that the computing device is in communication with a cloudlet management center.

Example 31 may include the subject matter of any of Examples 26-30, and may further include a lifecycle manager.

Example 32 may include the subject matter of Example 31, and may further specify that the lifecycle manager is to emulate a read-only device exposing configuration parameters to another computing device.

Example 33 may include the subject matter of any of Examples 31-32, and may further specify the lifecycle manager is to emulate a read-only device exposing log or diagnostic information to another computing device.

Example 34 may include the subject matter of any of Examples 26-33, and may further specify that the computing device performs one or more VNFs.

Example 35 may include the subject matter of any of Examples 26-34, and may further specify that the computing device includes one or more workload VMs.

Example 36 is a networked computing system including any of Examples 26-35.

Example 37 may include the subject matter of Example 36, and may further specify that the networked computing system is a MEC system.

Example 38 may include the subject matter of Example 36, and may further specify that the networked computing system is a 5G system.

Example 39 is a method for secure storage access, including: verifying, by a trusted execution environment of a computing device, a BIOS of the computing device; in response to verifying the BIOS, providing, by the trusted execution environment to the BIOS, a KEK for an SES of the computing device; and providing, to the SES by the BIOS, the KEK to unlock the SES.

Example 40 may include the subject matter of Example 39, and may further specify that the computing device is any of the computing devices of Examples 1-10 or Examples 26-35.

Example 41 is an apparatus including means for performing the method of any of Examples 18-20, any of Examples 39-40, any of Examples 43-45, or any other method disclosed herein.

Example 42 is one or more computer readable media (e.g., non-transitory computer readable media) having instructions thereon that, in response to execution by one or more processing devices of the computing device, cause the computing device to perform the method of any of Examples 18-20, any of Examples 39-40, any of Examples 43-45, or any other method disclosed herein.

Example 43 is a method for operating a cloudlet, including: booting a cloudlet that is remote from a data center, wherein the cloudlet boot cannot be tampered with by software executed by an operating system of the cloudlet; and receiving data at the cloudlet from a personal mobile computing device.

Example 44 may include the subject matter of Example 43, and may further include: detecting an attempt to tamper with hardware of the cloudlet; and in response to detection of the attempt to tamper with the hardware of the cloudlet, interrupting a boot process.

Example 45 may include the subject matter of any of Examples 43-44, and may further include performing, by the cloudlet, virtual network functions (VNFs) using the data received at the cloudlet.

Example 46 is a cloudlet, including: a secure processor, a BIOS in communication with the secure processor, an ME and an IE in communication with the BIOS, and an SES in communication with the BIOS, wherein the BIOS is to request a Key Encryption Key (KEK) from the IE, the IE is to verify the BIOS and provide the KEK to the BIOS subsequent to verification of the BIOS, the BIOS is to provide the KEK to the SES to unlock the SES for access by the IE, and the secure processor is to run virtual processes subsequent to the IE accessing the SES.

Example 47 may include the subject matter of any of Examples 1-42, and may further specify that the trusted execution environment includes processing resources that are hardware and software isolated from execution of an operating system on the computing device.

The invention claimed is:

1. A computing device, comprising:
   a trusted execution environment;
   a Basic Input/Output System (BIOS) configured to request a Key Encryption Key (KEK) from the trusted execution environment; and
   a Self-Encrypting Storage (SES) associated with the KEK;
   wherein the trusted execution environment is configured to verify the BIOS and provide the KEK to the BIOS subsequent to verification of the BIOS, and the BIOS is configured to provide the KEK to the SES to unlock the SES for access by the trusted execution environment.

2. The computing device of claim 1, wherein the trusted execution environment is a root-of-trust for the computing device.

3. The computing device of claim 1, wherein the trusted execution environment includes processing resources that are hardware and software isolated from execution of an operating system on the computing device.

4. The computing device of claim 1, wherein the computing device is a cloudlet.

5. The computing device of claim 1, wherein the trusted execution environment is configured to communicate with a remote management computing device to receive updates.

6. The computing device of claim 5, wherein the trusted execution environment includes a lifecycle manager configured to communicate with the remote management computing device over a RESTful interface.

7. The computing device of claim 6, wherein the lifecycle manager is configured to emulate a read-only device exposing configuration parameters to another computing device.

8. The computing device of claim 6, wherein the lifecycle manager is configured to emulate a read-only device exposing log or diagnostic information to another computing device.

9. The computing device of claim 1, further comprising Virtualized Network Function (VNF) logic.

10. The computing device of claim 1, further comprising Virtual Machine (VM) logic.

11. A networked computing system, comprising:
    a cloudlet, including:
      a trusted execution environment,
      a Basic Input/Output System (BIOS) configured to request a Key Encryption Key (KEK) from the trusted execution environment, and
      a Self-Encrypting Storage (SES) associated with the KEK,
    wherein the trusted execution environment is configured to provide the KEK to the BIOS, and the BIOS is configured to provide the KEK to the SES to unlock the SES for access by the trusted execution environment; and
    a cloudlet management center, remote from the cloudlet, in communication with the trusted execution environment.

12. The networked computing system of claim 11, wherein the networked computing system is a Mobile Edge Computing (MEC) system.

13. The networked computing system of claim 11, wherein the networked computing system is a Fifth Generation Mobile Network (5G) system.

14. The networked computing system of claim 11, further comprising multiple cloudlets in communication with the cloudlet management center.

15. The networked computing system of claim 11, wherein the trusted execution environment is an operator root-of-trust.

16. The networked computing system of claim 11, wherein the trusted execution environment is a manufacturer root-of-trust.

17. The networked computing system of claim 11, wherein the trusted execution environment is configured to receive an update image from the cloudlet management center while an operating system of the cloudlet continues to execute.

18. One or more non-transitory computer readable media having instructions thereon that, in response to execution by a Basic Input/Output System (BIOS) of a computing device, cause the computing device to:
    request a Key Encryption Key (KEK) for a Self-Encrypting Storage (SES) of the computing device;
    receive, from a trusted execution environment of the computing device in response to verification of the BIOS, the KEK; and
    provide the KEK to unlock the SES, wherein the SES is to use the KEK to unlock a Media Encryption Key (MEK), and the MEK encrypts data stored in the SES.

19. The one or more non-transitory computer readable media of claim 18, wherein the SES is partitioned and providing the key to unlock the SES includes providing the key to unlock a partition of the SES associated with the KEK.

20. The one or more non-transitory computer readable media of claim 18, wherein firmware configuration information is stored in the SES.

21. The one or more non-transitory computer readable media of claim 18, wherein the computing device is an edge server in a Mobile Edge Computing (MEC) network.

22. A method of operating a computing device, including:
    requesting, by a Basic Input/Output System (BIOS) of the computing device, a Key Encryption Key (KEK) for a Self-Encrypting Storage (SES) of the computing device;
    receiving, by the BIOS from a trusted execution environment of the computing device in response to verification of the BIOS, the KEK; and
    providing, by the BIOS, the KEK to unlock the SES for access by the trusted execution environment.

23. The method of claim 22, wherein the computing device is a server in a Mobile Edge Computing (MEC) network.

24. The method of claim 22, wherein the computing device is a server in a Fifth Generation Mobile Network (5G) system.

25. The method of claim 22, wherein the SES is to use the KEK to unlock a Media Encryption Key (MEK), and the MEK encrypts data stored in the SES.

* * * * *